(12) United States Patent
Liao

(10) Patent No.: US 8,079,755 B2
(45) Date of Patent: Dec. 20, 2011

(54) SOLAR ENERGY POWERED OUTDOOR TEMPERATURE AND HUMIDITY DETECTION DEVICE

(76) Inventor: Yi-Chia Liao, Miaoli County (TW)

(*) Notice: Subject to any disclaimer, the term of this patent is extended or adjusted under 35 U.S.C. 154(b) by 413 days.

(21) Appl. No.: 12/245,368

(22) Filed: Oct. 3, 2008

(65) Prior Publication Data
US 2010/0086007 A1 Apr. 8, 2010

(51) Int. Cl.
*G01N 25/02* (2006.01)
*G01K 1/08* (2006.01)
*G01K 1/12* (2006.01)
*G01K 13/00* (2006.01)

(52) U.S. Cl. ............ 374/109; 374/16; 374/28; 374/208; 73/866.5

(58) Field of Classification Search .............. 374/16, 374/28, 100, 109, 141, 208, 152, 101–102, 374/163, 183, 170; 73/73, 866.5
See application file for complete search history.

(56) References Cited

U.S. PATENT DOCUMENTS

| | | | |
|---|---|---|---|
| 4,601,589 A * | 7/1986 | Meisner | 374/208 |
| 5,859,762 A * | 1/1999 | Clark et al. | 361/679.41 |
| 5,889,466 A * | 3/1999 | Ferguson | 340/602 |
| 6,082,894 A * | 7/2000 | Batko et al. | 374/142 |
| 6,535,199 B1 * | 3/2003 | Canova et al. | 345/168 |
| 6,637,933 B1 * | 10/2003 | Liao | 374/142 |
| 6,655,223 B2 * | 12/2003 | March et al. | 73/866.5 |
| 7,114,848 B2 * | 10/2006 | Kaneko | 374/142 |
| 7,212,955 B2 * | 5/2007 | Kirshenbaum et al. | 702/187 |
| 7,334,938 B2 * | 2/2008 | Remsburg | 374/109 |
| 2006/0000558 A1 * | 1/2006 | Fennell | 160/7 |
| 2007/0223559 A1 * | 9/2007 | Wong et al. | 374/100 |

FOREIGN PATENT DOCUMENTS

| | | | | |
|---|---|---|---|---|
| CN | 201096901 Y | * | 8/2008 | |
| JP | 01233797 A | * | 9/1989 | |
| JP | 02022257 A | * | 1/1990 | |
| JP | 08220252 A | * | 8/1996 | |

* cited by examiner

*Primary Examiner* — Gail Verbitsky
(74) *Attorney, Agent, or Firm* — Apex Juris, pllc; Tracy M. Heims

(57) ABSTRACT

The present invention discloses a solar energy powered outdoor temperature and humidity detection device comprising a cover panel and a display panel. The cover panel further comprises a solar power supply unit and a temperature and humidity detection unit. The cover panel and the display panel are pivotally coupled by at least one pivotal member. The display panel further comprises a display screen and a microcomputer circuit. The microcomputer circuit receives temperature and humidity information from the temperature and humidity detection unit. The temperature and humidity information is transferred to the display screen by the microcomputer circuit and presented on the display screen. The display panel further has an attaching member, whereby the present invention can be mounted on a piece of glass. Thus, the solar power supply unit can absorb sunlight and generate direct current powering the temperature and humidity detection unit to detect outdoor temperature and humidity.

2 Claims, 3 Drawing Sheets

SOLAR ENERGY POWERED OUTDOOR TEMPERATURE AND HUMIDITY DETECTION DEVICE

FIELD OF THE INVENTION

The present invention relates to an outdoor detection device, particularly to a detection device, which is attached onto the external surface of a window to enable a user inside the house to learn outdoor temperature and humidity through the window.

BACKGROUND OF THE INVENTION

It is the best timing to exploit solar energy in the moment that global economics is seriously damaged by high-price fossil fuel. The sun projects enormous energy to the earth. The solar energy projected to the earth is 34% reflected back to the space, 19% absorbed by the atmosphere, and 47% absorbed by the surface of the earth. The solar energy reaching the surface of the earth amounts to $1.3 \times 10^{24}$ calories per year—about 26000 times the energy consumed by human being per year. If human beings can intelligently exploit solar energy, solar energy will power human beings endlessly.

In addition to houses, hi-tech agriculture businesses, meteorological organizations, outdoor activity businesses, etc., also need outdoor temperature and humidity information. However, the conventional temperature and humidity detection devices have to be powered by batteries or commercial electricity. Thus, the long-term power expense of the related businesses is pretty high.

Therefore, how to develop an outdoor temperature and humidity detection device, which is not conventionally powered by batteries or commercial electricity but adopts an approach to reduce power expense, is an important topic of the related manufactures. Thus, the Inventor was devoted to the researches, experiments and improvements and finally proposes the present invention to overcome the abovementioned problem.

SUMMARY OF THE INVENTION

One objective of the present invention is to provide a solar energy powered outdoor temperature and humidity detection device.

To achieve the abovementioned objective, the present invention comprises a cover panel and a display panel. The cover panel further comprises a solar power supply unit and a temperature and humidity detection unit. The display panel is pivotally coupled to the cover panel with at least one pivotal member. The display panel further comprises a display screen and a microcomputer circuit. The microcomputer circuit receives temperature and humidity information from the temperature and humidity detection unit. The temperature and humidity information is transferred to the display screen by the microcomputer circuit and presented on the display screen. The display panel further has an attaching member, whereby the present invention can be easily mounted on a window's external surface where the solar power supply unit can absorb sunlight to generate power and the temperature and humidity detection unit can detect outdoor temperature and humidity. The installation of the present invention neither needs specialists nor spends time on cable wiring, and a user can easily install the present invention to learn outdoor temperature and humidity through a window. The solar energy powered outdoor temperature and humidity detection device of the present invention has the following advantages:

1. Easy and convenient installation: The present invention can be easily mounted onto the external surface of a window with the attaching member of the display panel without drilling a wall. Then, a user inside the house can learn outdoor temperature and humidity information through the window.

2. Minimum power consumption: The solar energy powered device of the present invention can greatly reduce power consumption for the businesses needing outdoor temperature and humidity information, such as hi-tech agriculture businesses, meteorological organizations, and outdoor activity businesses.

DETAILED DESCRIPTION OF THE INVENTION

Below, the technical contents will be described in detail with the embodiments. However, it should be understood that the embodiments are only to exemplify the present invention but not to limit the scope of the present invention.

Figure 1:
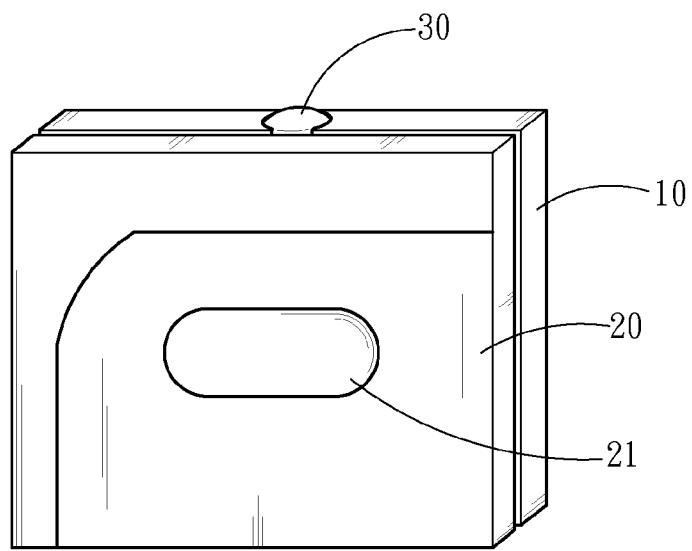
FIG. 1 is a perspective view schematically showing the appearance of a solar energy powered outdoor temperature and humidity detection device according to the present invention.
Figure 2:
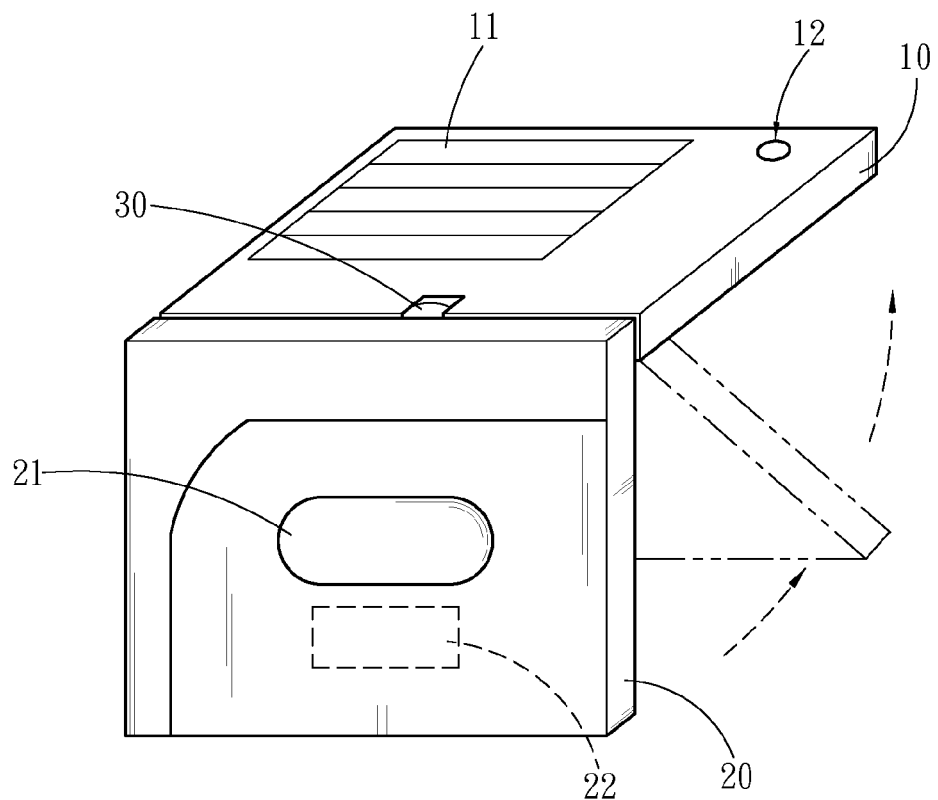
FIG. 2 is a perspective view schematically showing a solar energy powered outdoor temperature and humidity detection device according to one embodiment of the present invention.
Figure 3:
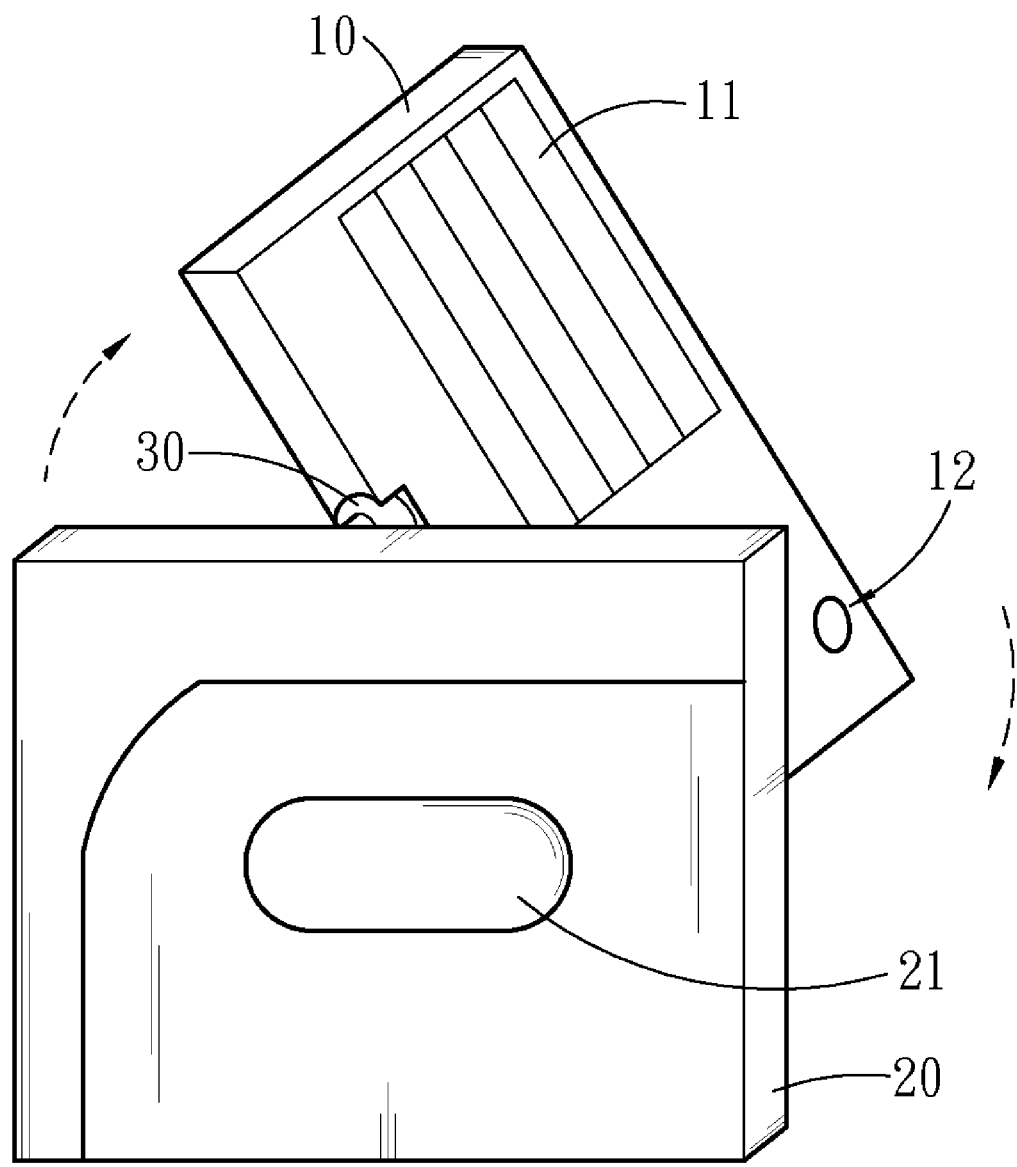
FIG. 3 is a perspective view schematically showing a solar energy powered outdoor temperature and humidity detection device according to another embodiment of the present invention.

Refer to FIG. 1, FIG. 2 and FIG. 3. The solar energy powered outdoor temperature and humidity detection device of the present invention comprises a cover panel 10 and a display panel 20. The cover panel 10 further comprises a solar power supply unit 11 and a temperature and humidity detection unit 12. The solar power supply unit 11 can effectively absorb sunlight and convert sunlight into direct current powering and the temperature and humidity detection unit 12 to obtain the temperature and humidity information of the environment.

The display panel 20 further comprises a display screen 21 and a microcomputer circuit 22. The microcomputer circuit 22 receives temperature and humidity information from the temperature and humidity detection unit 12. The temperature and humidity information is transferred to the display screen 21 by the microcomputer circuit 22 and presented on the display screen 21. From the display screen 21, the user inside a house can learn outdoor temperature and humidity information through a window. The temperature and humidity information may be presented with numerals, graphs, text, or colors of lights.

The cover panel 10 and the display panel 20 are pivotally coupled by at least one pivotal member 30. The pivotal member 30 provides at least one degree of rotational freedom. In addition to the degree of rotational freedom for lifting the cover panel 10 from the display panel 20 in one direction, the present invention also has a degree of rotational freedom for swiveling the cover panel 10 in another direction, whereby the angle of the cover panel 10 can be adjusted to make the best of sunlight.

Figure 4:
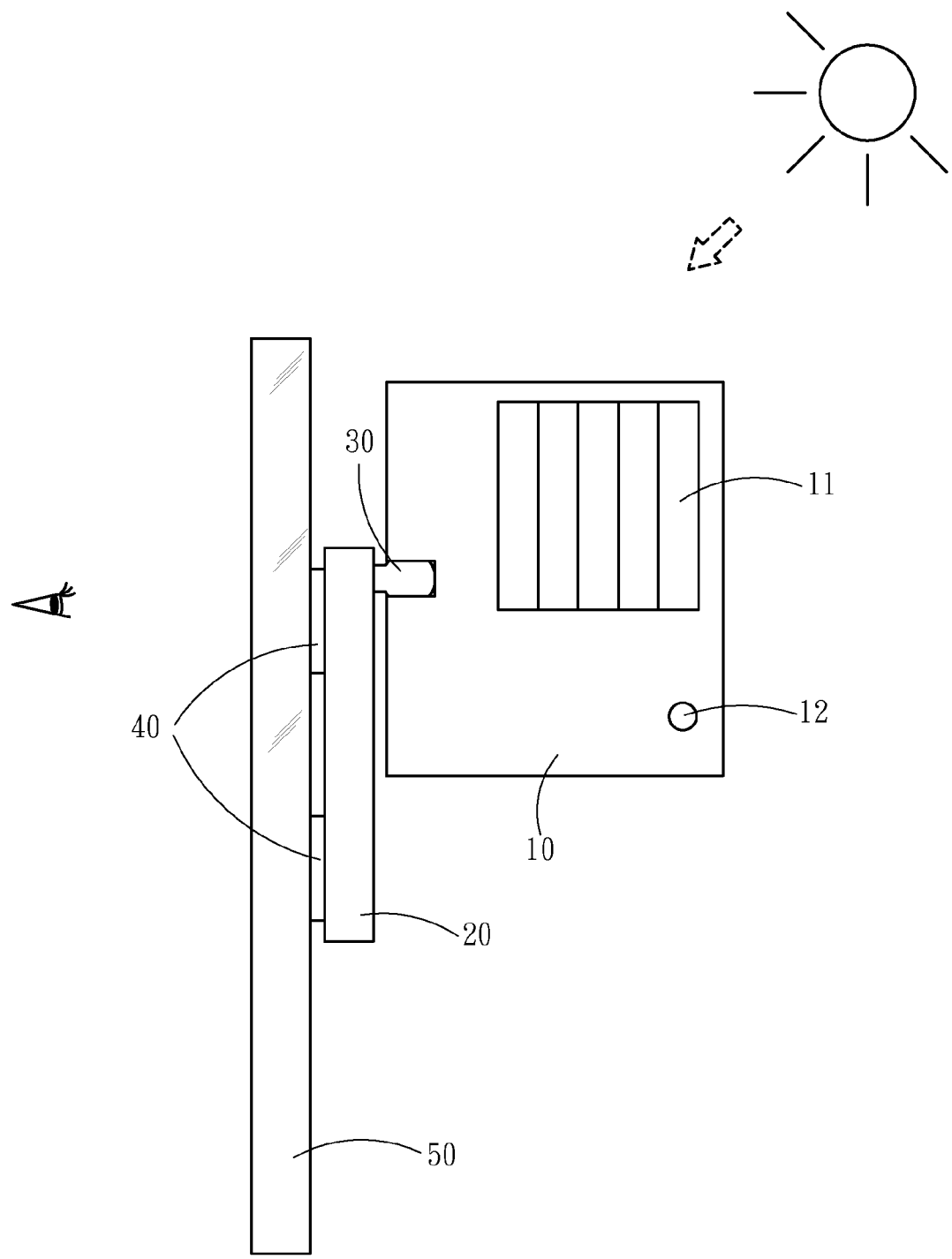
FIG. 4 is a diagram schematically showing the application of a solar energy powered outdoor temperature and humidity detection device according to the present invention.

Refer to FIG. 4 a diagram schematically showing the application of the present invention. The display panel 20 further has at least one attaching member 40, whereby the present invention can be mounted on a piece of glass 50. Thus, the solar power supply unit 11 can absorb sunlight and generate direct current powering the temperature and humidity detection unit 12 to detect outdoor temperature and humidity. The attaching member 40 may be realized with an attached disc, a twin adhesive, a fabric hook-and-loop fastener. Therefore, the installation of the present invention neither needs specialists nor spends time on cable wiring. Thus, a user can easily install the present invention to detect outdoor temperature and humidity.

To reduce electric power expense, the present invention does not adopt a conventional power supply method but uses the solar power supply unit 11 to absorb sunlight and generate DC power. As the method of converting solar energy into electric power is not the focus of the present invention but a conventional technology, it will not repeat herein.

In conclusion, the device of the present invention is mounted onto the piece of glass 50 via the attaching member 40 of the display panel 20. Next, the temperature and humidity detection unit 12 detects the temperature and humidity of the environment and transmits the temperature and humidity information to the microcomputer circuit 22 of the display panel 20. The temperature and humidity information is processed and calculated by the microcomputer circuit 22 and then transmitted to and presented by the display screen 21. Thus, a user inside a house can learn outdoor temperature and humidity through the piece of glass 50. Besides, the device of the present invention is completely powered by the solar power supply unit 11.

The installation of the present invention needs neither cable-wiring nor hole-drilling. The installation of the present invention needs only attaching the attaching member 40 onto the piece of glass 50. Through the piece of glass 50, a user inside the house can learn from the display screen 21 the outdoor temperature and humidity detected by the temperature and humidity detection unit 12. Thus, the present invention has high applicability and favors the businesses needing outdoor temperature and humidity information, such as hi-tech agriculture businesses, livestock farming businesses, meteorological organizations, and outdoor activity businesses.

The embodiments described above are only to exemplify the present invention but not to limit the scope of the present invention. Therefore, any equivalent modification or variation according to the spirit of the present invention is to be also included within the scope of the present invention.

What is claimed is:

1. A solar energy powered outdoor temperature and humidity detection device used to detect temperature and humidity and comprising a cover panel further comprising a solar power supply unit and a temperature and humidity detection unit detecting temperature and humidity of an environment; and a display panel pivotally coupled to said cover panel with at least one pivotal member and further comprising a display screen and a microcomputer circuit, wherein said microcomputer circuit receives temperature and humidity information from said temperature and humidity detection unit, and said temperature and humidity information is transferred to said display screen by said microcomputer circuit and presented on said display screen.

2. The solar energy powered outdoor temperature and humidity detection device according to claim 1, wherein said pivotal member provides at least one degree of rotational freedom for said cover panel.

* * * * *